Figure 1:
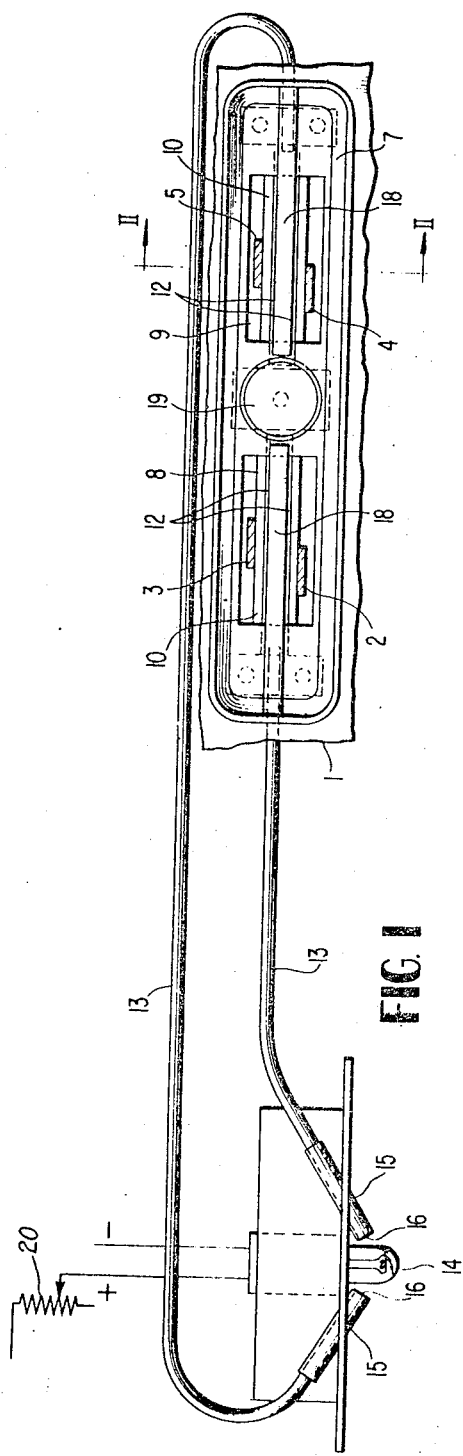

United States Patent
Frey et al.

[15] 3,654,452
[45] Apr. 4, 1972

[54] INSTRUMENT BOARD IN A MOTOR VEHICLE

[72] Inventors: Egon Frey, Stuttgart-Degerloch; Horst Kaisser, Sindelfingen, both of Germany

[73] Assignee: Daimler-Benz Aktiengesellschaft, Stuttgart-Unterturkheim, Germany

[22] Filed: Oct. 30, 1969

[21] Appl. No.: 872,714

[30] Foreign Application Priority Data

Nov. 2, 1968 Germany.....................P 18 06 718.0

[52] U.S. Cl. ............................................................240/8.16
[51] Int. Cl. ..................................................B60q 3/04
[58] Field of Search ..................................240/8.16; 350/96 R

[56] References Cited

UNITED STATES PATENTS

| 2,337,746 | 12/1943 | Garstang | 240/8.16 X |
| 2,855,710 | 10/1958 | Roper | 240/8.16 X |
| 3,278,739 | 10/1966 | Royka et al. | 240/8.16 X |
| 3,423,581 | 1/1969 | Baer | 240/8.16 |

*Primary Examiner*—S. Clement Swisher
*Assistant Examiner*—William A. Henry, II
*Attorney*—Craig, Antonelli and Hill

[57] ABSTRACT

An instrument panel for a motor vehicle in or at which instruments, actuating levers, and/or actuating knobs are arranged and in which one of the instruments is adapted to be illuminated by an incandescent lamp; light-conducting cables conduct the light from the incandescent lamp to one or several of the other instruments, actuating levers or actuating knobs, and a light-distributing body is connected to each light-conducting cable at the remote place to be illuminated.

22 Claims, 2 Drawing Figures

PATENTED APR 4 1972

3,654,452

INVENTORS
EGON FREY
HORST KAISSER

BY
*Craig, Antonelli, Stewart & Hill*

ATTORNEYS

INSTRUMENT BOARD IN A MOTOR VEHICLE

The present invention relates to an instrument panel in a motor vehicle, in or at which instruments and actuating levers or actuating knobs are arranged and in which one of the instruments is illuminated by an incandescent or electric lamp preferably adjustable in its brightness.

In motor vehicles, it is possible as a rule without special expenditures to illuminate in the instrument panel or board, the most important instruments since these instruments are, for the most part, arranged, combined or clustered. In contradistinction thereto, it is relatively difficult to illuminate in addition to the combined or clustered instruments—instruments, actuating levers or actuating knobs disposed further removed therefrom even though it would undoubtedly be desirable if some of these instruments, levers, or knobs could be illuminated, particularly in such a manner that the brightness of the illumination is controllable.

The present invention is concerned with the aim to create with simple means the possibility for an illumination of instruments, actuating levers and actuating knobs in connection with which an illumination by means of an electric bulb or incandescent lamp is otherwise too complicated or is impossible for reasons of lacking space.

The underlying problems are solved in accordance with the present invention in that light-conducting cables are provided which conduct the light of the incandescent lamp from the illuminated instrument in the instrument board or panel to one or several of the other instruments, actuating levers or actuating knobs, and in that a light-distributing body consisting of glass or suitable synthetic resinous material is connected to each light cable at the place to be illuminated.

One succeeds by the utilization of light-conducting cables to utilize repeatedly or several times the light of an already present electric bulb or incandescent lamp and to conduct the same to otherwise inaccessible places. If the brightness of the incandescent lamp is additionally controllable by an interconnected potentiometer, this advantage becomes effective without additional expenditures also by way of the light-conducting cables. Furthermore, the arrangement of a light-distributing body at the end of a light-conducting cable entails the advantage that the illumination can be individually constituted as regards the illuminating surface.

In an advantageous type of construction of the present invention, in an instrument board or panel with an actuating lever guided in a slot, a light-distributing body connected to a light-conducting cable in the form of a light-conducting rod may be arranged at least at one longitudinal edge of the slot to the rear of the structural part forming the slot in such a manner that the light-conducting rod projects over the entire length of the slot beyond the longitudinal edge thereof by preferably a slight amount. An illumination is achieved thereby, by means of which the existing position of the actuating lever in the slot is readily recognizable.

With an instrument board or panel having four actuating levers controlling, for example, the heating and ventilating system, guided in slots and arranged pair-wise, of which the actuating levers of one pair are arranged in horizontal slots one above the other while the actuating levers of the other pair are arranged adjacent thereto and an intermediate member is provided subdividing each slot into two superposed slots and assuming the guidance of the actuating levers, the arrangement may advantageously be made according to the present invention in such a manner that in the intermediate member between the pair-wise actuating levers arranged one above the other, there is arranged within a longitudinal groove quadrangular in cross section, a light-conducting rod of corresponding cross section and connected to a light cable.

This light-conducting rod may be provided with a longitudinal groove which serves for the mounting of a decorative strip subdividing the light-conducting rod.

Accordingly, it is an object of the present invention to provide an instrument board for motor vehicles which eliminates the aforementioned shortcomings and drawbacks encountered in the prior art by extremely simple means.

Another object of the present invention resides in instrument panels for motor vehicles which permit the illumination of instruments, actuating levers, and/or actuating knobs located at a distance from an instrument cluster without involving complicated constructions and without requiring large amounts of space.

A further object of the present invention resides in instrument panels for motor vehicles which permit the repeated utilization of a light from one light source for several instruments, actuating levers or actuating knobs without requiring separate incandescent lamps for the illumination of spatially separated areas.

Figure 2:
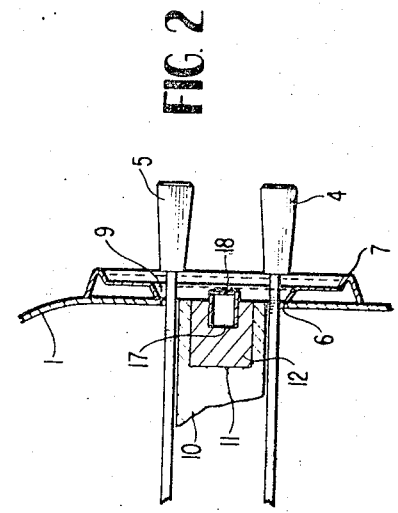

These and further objects, features and advantages of the present invention will become more obvious from the following description when taken in connection with the accompanying drawing which shows, for purposes of illustration only, one embodiment in accordance with the present invention, and wherein:

FIG. 1 is a somewhat schematic elevational view of an installation equipped with actuating levers for the control of the heating and ventilating system in the instrument panel of a motor vehicle in accordance with the present invention; and FIG. 2 is a cross-sectional view through the installation taken along line II—II of FIG. 1.

Referring now to the drawing wherein like reference numerals are used throughout the various views to designate like parts, according to the embodiment illustrated in FIGS. 1 and 2, the levers 2,3 and the levers 4,5, for the control of the heating and ventilating systems are provided at the instrument panel or board 1 of a motor vehicle. The levers 2 and 3 are thereby arranged one above the other which is also the case of the levers 4 and 5, whereby the levers 4 and 5 are located adjacent the levers 2 and 3. All the levers 2, 3, 4, and 5 project through the slot 6 in the instrument panel 1 which is covered in the direction toward the vehicle interior by the flanged element 7 provided with the slot 8 for the levers 2 and 3 and with the slot 9 for the levers 4 and 5. Behind the instrument panel 1 and projecting into the slot 6 is arranged the intermediate element 10 disposed in a horizontal direction which serves for the guidance of the levers and against which abut the levers 2 and 4 from below and the levers 3 and 5 from above. Longitudinal grooves 11 of square cross section are provided in the intermediate element 10 within the area of the slots 8 and 9 and light-conducting rods 12 of conventional construction and consisting, for example, of conventional plastic (synthetic) glass, are inserted into these longitudinal grooves 11. A light-conducting cable 13 is connected to each light-conducting rod 12 laterally of the collar 7.

Both light-conducting cables 13 which consist in a conventional manner of a large number of glass fibers and which are covered with a synthetic resinous material jacket or sheath non-transparent or impervious to light, lead behind the instrument panel 1 to an instrument arranged at the instrument panel which is illuminated in the usual manner by an electric lamp 14. The ends of the light-conducting cables 13 are enclosed in metal sleeves 15 in proximity to the electric lamp 14. The end faces 16 of the light-conducting cables 13 directed toward the electric light 14 are ground flat or plane. Also, the ends of the light-conducting cable 13 connected to the light-conducting rods 12 are enclosed in metal sleeves and are ground flat or plane. The light-conducting cables 13 are inserted with the ends ground flat into bores within the light-conducting rods 12 where they abut at a plane or flat surface.

In order to produce a separation of the illumination for the lower levers 2 and 4 and for the upper levers 3 and 5, decorative strips 18 are inserted into the longitudinal grooves 17 provided in the light-conducting rods 12, which decorative strips extend outwardly up to the inner edge of the flanged element 7 and inwardly up to the rotary knob 19 provided in the center of the flanged element 7.

When the electric lamp 14 is turned on in order to illuminate the instrument coordinated thereto, light radiated by the electric lamp 14 is conducted by way of the light-conducting cables 13 to the light-conducting rods 12 where it is radiated along the light-conducting rods. Since the light-conducting rods 12 are subdivided by the decorative strips 18, only narrow bands light up in the slots 8 and 9. This, however, suffices in order to render recognizable without any danger of blinding, the existing position of the levers 2, 3 and of the levers 4, 5 along the slots 8, 9, respectively.

In the event that the brightness of the electric lamp 14 is constructed adjustable by means of a potentiometer 20, than also the brightness of the illuminated bands of the light-conducting rods 12 along the slots 8 and 9 is adjustable automatically therewith.

While we have shown and described only embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of those skilled in the art.

We claim:

1. In an instrument panel in a motor vehicle having an instrument eliminated by an electric lamp, the improvement comprising a light-conducting cable for receiving light generated by said electric lamp and conducting said light to a location adjacent said instrument which is to be eliminated, and strip means, for receiving the light conducted through said light conducting cable, for distributing said light therethroughout in a plurality of different directions, while transmitting a substantial portion of said distributed light toward said instrument in a direction transverse to the surface thereof so as to eliminate the instrument adjacent thereto.

2. An instrument panel according to claim 1, characterized in that at least one additional instrument is located at said location.

3. An instrument panel according to claim 2, characterized in that at least one actuating lever means is arranged at said location.

4. An instrument panel according to claim 3, characterized in that at least one actuating knob means is arranged at said location.

5. An instrument panel according to claim 4, characterized by means for adjusting the brightness of the electric lamp.

6. An instrument panel according to claim 1, characterized in that each light-distributing strip means essentially consists of glass.

7. An instrument panel according to claim 1, characterized in that each light-distributing strip means essentially consists of synthetic resinous material.

8. An instrument panel according to claim 1, characterized in that at least one actuating lever means is arranged at said location.

9. An instrument panel according to claim 1, characterized in that at least one actuating knob means is arranged at said location.

10. An instrument panel according to claim 1, characterized by means for adjusting the brightness of the electric lamp.

11. An instrument panel in a motor vehicle in which an instrument is adapted to be illuminated by an electric lamp, characterized by light-conducting cable means conducting the light of the electric lamp from the illuminated instrument to a place to be illuminated which is spaced from said instrument, and light-distributing body means connected to each light-conducting cable means at the place to be illuminated, with actuating lever means guided in slot means, characterized in that at least along one longitudinal edge of the slot means a light-distributing body means operatively connected with a light-conducting cable means is arranged in the form of a light-conducting rod means behind the structural part forming said slot means in such a manner that the light-conducting rod means projects substantially over the entire length of the slot means beyond the longitudinal edge thereof.

12. An instrument panel according to claim 11, characterized in that said light-conducting rod means projects beyond said longitudinal edge by a slight amount.

13. An instrument panel according to claim 11, with actuating lever means guided in slot means and arranged pair-wise, of which the actuating lever means of one pair are arranged in substantially horizontal slots disposed one above the other and the actuating lever means of the other pair are arranged adjacent the same, and in that an intermediate element is provided in each slot means assuming the function of guiding the actuating lever means and subdividing the slot means into two superposed slots, characterized in that a light-conducting rod means operatively connected with a light-conducting cable means is arranged in the intermediate element between the pair-wise superposed actuating lever means within a longitudinal groove thereof.

14. An instrument panel according to claim 13, characterized in that said longitudinal groove is of quadrangular cross section and in that said light-conducting rod means is of corresponding cross section.

15. An instrument panel according to claim 13, characterized in that said actuating lever means adjusts the heating and ventilating system of the motor vehicle.

16. An instrument panel according to claim 15, characterized in that said last-mentioned longitudinal groove is of square cross section.

17. An instrument panel according to claim 15, characterized in that the light-conducting rod means is provided with a longitudinal groove which serves for purposes of mounting a decorative strip means subdividing the light-conducting rod means.

18. An instrument panel in a motor vehicle in which an instrument is adapted to be illuminated by an electric lamp, characterized by light-conducting cable means conducting the light of the electric lamp from the illuminated instrument to a place to be illuminated which is spaced from said instrument, and light-distributing body means connected to each light-conducting cable means at the place to be illuminated, with actuating lever means guided in slot means and arranged pairwise, of which the actuating lever means of one pair are arranged in substantially horizontal slots disposed one above the other and the actuating lever means of the other pair are arranged adjacent the same, and in that an intermediate element is provided in each slot means assuming the function of guiding the actuating lever means and subdividing the slot means into two superposed slots, characterized in that a light-conducting rod means operatively connected with a light-conducting cable means is arranged in the intermediate element between the pair-wise superposed actuating lever means within a longitudinal groove thereof.

19. An instrument panel according to claim 18, characterized in that said longitudinal groove is of quadrangular cross section and in that said light-conducting rod means is of corresponding cross section.

20. An instrument panel according to claim 19, characterized in that said last-mentioned longitudinal groove is of square cross section.

21. An instrument panel according to claim 18, characterized in that said actuating lever means adjusts the heating and ventilating system of the motor vehicle.

22. An instrument panel according to claim 18, characterized in that the light-conducting rod means is provided with a longitudinal groove which serves for purposes of mounting a decorative strip means subdividing the light-conducting rod means.

* * * * *